Patented Nov. 6, 1945

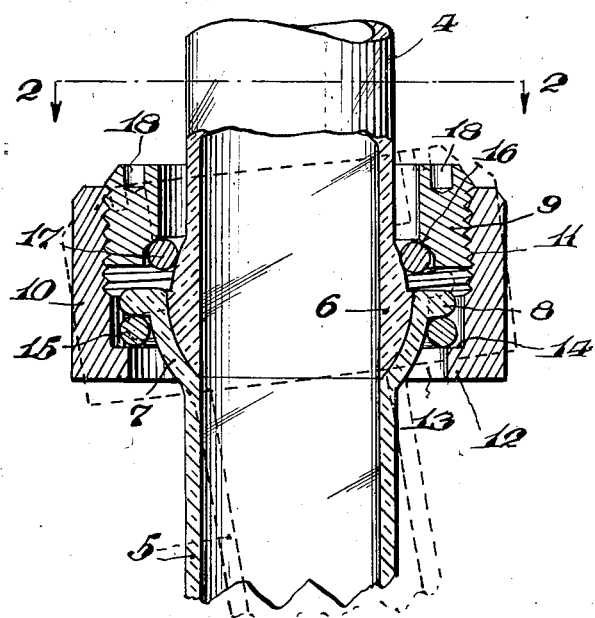
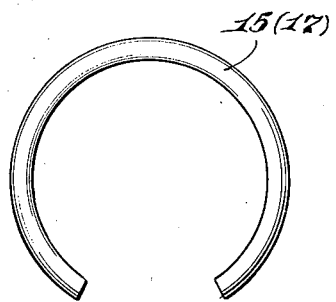
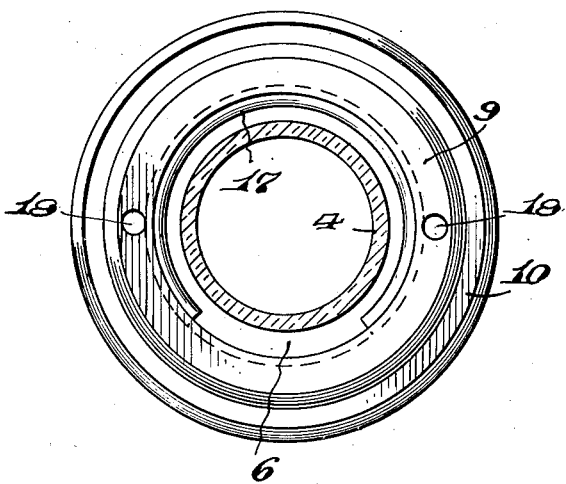

2,388,633

UNITED STATES PATENT OFFICE 2,388,633

CLAMP FOR SPHERICAL JOINTS

Charles M. De Woody, Vineland, N. J., assignor to Ace Glass Incorporated, Vineland, N. J., a corporation of New Jersey Application December 23, 1943, Serial No. 515,443

5 Claims. (Cl. 285—95)

This invention relates to spherical joints of the ball and socket type, and more particularly to clamping means for holding the elements of such joints together; permitting a universal movement while maintaining a leakproof seal.

Many clamps have been proposed for holding the parts of spherical joints together and some of these employ bolts as a means for tightening the clamp on the joint. It has been my experience with glass joints that bolt tightening produces local compression areas in the vicinity of individual bolts, and that such a clamp permits leakage through the joint, especially in areas between the bolts, when elevated internal pressures are used. The natural reaction in such cases is to further tighten the bolts, which more often than not results in breakage of the female flanged portion because of the severe strain.

The primary object of the invention is to overcome such difficulties and to provide means whereby a sufficiently uniform circumferential pressure may be produced upon the ball and socket when the clamp is tightened, to eliminate leakage.

Another object of the invention is to provide a combination spherical joint and clamping means in which the clamp and ball member may be connected with the socket member to provide a complete joint even though the socket member is so arranged that the clamp could not be applied from the smaller end thereof.

With the foregoing objects outlined and with other objects in view which will appear as the description proceeds, the invention consists in the novel features hereinafter described in detail, illustrated in the accompanying drawing, and more particularly pointed out in the appended claims.

Referring to the drawing:

Fig. 1 is a diametrical sectional view partly in elevation of a spherical joint in which the parts are held together by my improved clamp.

Fig. 2 is a transverse sectional view on the line 2—2 of Fig. 1.

Fig. 3 is a plan view of one of the split rings forming part of the clamp.

Fig. 4 is a similar view of an elastic ring which may be used in place of a split ring.

Referring to the drawing, 4 and 5 designate respectively sections of tubing, shown as made of glass, one terminating in a ball 6 and the other in a socket 7, to receive the ball. This joint may be of the kind shown in the W. F. Schelling Reissue Patent 22,181; in which the socket terminates in an outwardly extending annular flange 8.

In accordance with my invention, the joint is held together and maintained in a leak-proof condition by a clamp consisting mainly of male and female collars respectively designated 9 and 10, having threaded engagement with one another as indicated at 11. Collar 10 is provided at one end with an outwardly extending annular flange 12 bordering an aperture 13 of sufficient size to pass by the flange 8 when the collar 10 is slipped over the socket from the open end thereof. The flange 12 forms an annular shelf 14 within the collar 10, serving as an abutment surface for a split ring 15 which may be formed of resilient material so that it may readily contract to snugly engage the external surface of the socket. The split ring is, also, designed to abut against the inner face of the flange 8.

Collar 9 is provided internally with an annular surface 16, preferably flaring toward the flange 8 and designed to serve as an abutment for another preferably resilient split ring 17 adapted to hug the surface of the ball above the largest (horizontal) circumference thereof.

Instead of using split rings, I may employ a stretchable rubber ring 19 (Fig. 4) in substitution for either ring 15 or 19.

To facilitate tightening of the clamp, the collar 9 may be provided with cavities 18 for the reception of a suitable tool.

In placing the clamp in position, the threaded collars are passed over the female and male sections respectively and moved back from the joint. The split rings are then passed over the tubing and inserted in the collars. The latter are then brought together and tightened by means of the threads.

When the clamp is in position, it will be noted that there is sufficient clearance between the protruding flange 8 and the inner end of the collar 9 to permit leak-proof movements of the joint. It is for this reason that the split ring 17 contacts the upper part of the ball section at the midpoint. While the split ring 15 is not shown in this position relative to the socket, it will be understood that its position is not strictly limited.

From the foregoing it is believed that my improved clamp and the advantages thereof may be readily understood, and it is manifest that changes may be made in the details disclosed without departing from the spirit of the invention as expressed in the claims.

What I claim and desire to secure by Letters Patent is:

1. The combination with a ball and socket joint having parti-spherical outer surfaces, of a clamp comprising a plurality of collars surrounding the joint and in threaded connection with one another, one of said collars being of sufficient size to be passed endwise over the ball and the other of sufficient size to be passed endwise over the socket, and each collar having an abutment surface arranged at an angle to the axis of the joint, and ring means engaging respectively an abutment surface of one of the collars and a parti-spherical surface of one of the members of the joint.

2. The combination with a spherical joint including ball and socket members provided with parti-spherical outer surfaces, of clamping means consisting of a plurality of collars having threaded engagement with one another, the smallest internal diameter of one of the collars being of sufficient size to permit said collar to be passed endwise over the end of the socket member, the smallest internal diameter of the other collar being of sufficient size to allow the last mentioned collar to be slipped endwise over the ball member, each collar being provided with an internal annular surface arranged at an angle to the axes of the collars, and ring means engaging the abutment surfaces and embracing respectively a parti-spherical surface of one of the members of the joint.

3. The combination with a spherical joint consisting of ball and socket members having parti-spherical external surfaces, of resilient split rings embracing such surfaces, and a pair of threaded collars in threaded engagement with one another and abutting respectively against said rings, one of said collars being of sufficient internal diameter to pass endwise over the end of the female member of the joint and the other collar being of sufficient internal diameter to pass endwise over the male member of the joint.

4. In a joint of the character described, a female member terminating in a protruding flange merging with an external parti-spherical surface, a male member snugly engaging the female member and provided with a parti-spherical external surface, a first threaded collar of sufficient internal diameter to be passed endwise past said flange and having an internal annular shelf, ring means abutting against said shelf and against the parti-spherical surface of the socket member, a second collar extending into and adjustably connected with the first collar, the second collar being of sufficient internal diameter to be passed endwise past the male member and provided internally with an annular surface arranged at an angle to the axes of the collars, and second ring means abutting against the last mentioned surface and against the parti-spherical surface of the ball member.

5. The combination with a glass ball and socket joint, having parti-spherical outer surfaces, of a clamp comprising a plurality of rigid collars surrounding the joint and in threaded connection with one another, one of said collars being of sufficient size to be passed endwise over the ball, and the other of sufficient size to be passed endwise over the socket, each collar having an abutment surface arranged at an angle to the axis of the joint, and expansive ring means engaging respectively an abutment surface of one of the collars and a parti-spherical surface of one of the members of the joint.

CHARLES M. DE WOODY.